(12) United States Patent
Han

(10) Patent No.: US 11,361,054 B2
(45) Date of Patent: Jun. 14, 2022

(54) BLOCKCHAIN-BASED INFRINGEMENT DETECTION METHOD, APPARATUS, AND ELECTRONIC DEVICE

(71) Applicant: Alipay (Hangzhou) Information Technology Co., Ltd., Zhejiang (CN)

(72) Inventor: Zhe Han, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/362,127

(22) Filed: Jun. 29, 2021

(65) Prior Publication Data

US 2022/0050887 A1 Feb. 17, 2022

(30) Foreign Application Priority Data

Aug. 14, 2020 (CN) .......................... 202010818561.8

(51) Int. Cl.
*G06F 21/00* (2013.01)
*G06F 21/10* (2013.01)

(52) U.S. Cl.
CPC ...... *G06F 21/10* (2013.01); *G06F 2221/0753* (2013.01)

(58) Field of Classification Search
CPC .. G06F 16/27; G06F 16/2468; G06F 3/04842; G06Q 10/10
See application file for complete search history.

(56) References Cited

U.S. PATENT DOCUMENTS

| | | | |
|---|---|---|---|
| 10,339,523 B2 * | 7/2019 | McDonough | .......... G06Q 20/12 |
| 2020/0117690 A1 * | 4/2020 | Tran | .................. G06F 16/90332 |
| 2020/0133955 A1 * | 4/2020 | Padmanabhan | ..... G06F 16/2379 |
| 2020/0250374 A1 * | 8/2020 | Huang | .................. G06F 40/289 |
| 2020/0272768 A1 * | 8/2020 | Zou | .......................... G06F 21/10 |
| 2021/0150477 A1 * | 5/2021 | Shrinivasan | .......... H04L 9/0637 |
| 2021/0174292 A1 * | 6/2021 | Barry | .................. G06F 16/2468 |
| 2021/0182871 A1 * | 6/2021 | Zhang | ..................... G06F 21/10 |
| 2021/0256070 A1 * | 8/2021 | Tran | .................. G06F 16/90332 |
| 2022/0023742 A1 * | 1/2022 | Tran | ........................ G16H 30/20 |

FOREIGN PATENT DOCUMENTS

| | | |
|---|---|---|
| CN | 109614775 A | 4/2019 |
| CN | 110968842 A | 4/2020 |
| CN | 111046346 A | 4/2020 |
| CN | 111414589 A | 7/2020 |

* cited by examiner

*Primary Examiner* — Josnel Jeudy
(74) *Attorney, Agent, or Firm* — Finnegan, Henderson, Farabow, Garrett & Dunner, LLP

(57) ABSTRACT

A blockchain-based infringement detection method includes: receiving a registration transaction initiated by a user, wherein the registration transaction includes key data of a work to be deposited and a contract address of a smart contract; invoking, in response to the registration transaction, a first detection logic declared in the smart contract corresponding to the contract address, extracting a feature value from work content of the work to be deposited, and matching the extracted feature value with a feature value of a deposited work in the blockchain; if the matching succeeds, further invoking a second detection logic declared in the smart contract corresponding to the contract address, matching the key data of the work to be deposited with key data of the deposited work in the blockchain, and when the matching succeeds, determining that the work to be deposited has an infringement risk.

20 Claims, 10 Drawing Sheets

BLOCKCHAIN-BASED INFRINGEMENT DETECTION METHOD, APPARATUS, AND ELECTRONIC DEVICE

CROSS-REFERENCE TO RELATED APPLICATIONS

The present application is based upon and claims priority to Chinese Patent Application No. 202010818561.8, filed on Aug. 14, 2020, the entire content of which is incorporated herein by reference.

TECHNICAL FIELD

Embodiments of the present specification relate to the field of blockchain technologies, and in particular, to a blockchain-based infringement detection method, apparatus, and electronic device.

BACKGROUND

Blockchain technology, also known as distributed ledger technology, is an emerging technology in which several computing devices participate in "bookkeeping" and jointly maintain a complete distributed database. Because the blockchain technology has the characteristics of decentralization, openness and transparency, each computing device being allowed to participate in database recording, and rapid data synchronization between computing devices, the blockchain technology has been widely used in many fields.

SUMMARY

According to a first aspect of embodiments of the present specification, a blockchain-based infringement detection method is provided, wherein a blockchain stores key data of a deposited work and a feature value extracted from work content of the deposited work, and the key data includes data proving that the work is an original work; and the blockchain is deployed with a smart contract for infringement detection of a work to be deposited. The method includes: receiving a registration transaction initiated by a user, wherein the registration transaction includes key data of the work to be deposited and a contract address of the smart contract; invoking, in response to the registration transaction, a first detection logic declared in the smart contract corresponding to the contract address, extracting a feature value from work content of the work to be deposited, and matching the extracted feature value with the feature value of the deposited work in the blockchain; and further invoking, if the matching succeeds, a second detection logic declared in the smart contract corresponding to the contract address, matching the key data of the work to be deposited with the key data of the deposited work in the blockchain, and when the matching succeeds, determining that the work to be deposited has an infringement risk.

According to a second aspect of an embodiment of the present specification, a blockchain-based infringement detection device is provided, wherein a blockchain stores key data of a deposited work and a feature value extracted from work content of the deposited work, and the key data includes data proving that the work is an original work; and the blockchain is deployed with a smart contract for infringement detection of a work to be deposited. The device includes a processor; and a memory storing instructions executable by the processor, wherein the processor is configured to: receive a registration transaction initiated by a user, wherein the registration transaction includes key data of the work to be deposited and a contract address of the smart contract; invoke, in response to the registration transaction, a first detection logic declared in the smart contract corresponding to the contract address, extract a feature value from work content of the work to be deposited, and match the extracted feature value with the feature value of the deposited work in the blockchain; and further invoke, if the matching succeeds, a second detection logic declared in the smart contract corresponding to the contract address, match the key data of the work to be deposited with the key data of the deposited work in the blockchain, and when the matching succeeds, determine that the work to be deposited has an infringement risk.

Embodiments of the present specification provide a blockchain-based infringement detection solution, which may quickly perform infringement determination on the work to be deposited by using a double-layer detection mechanism of rapid detection and in-depth detection. In the fast detection layer, a relatively small amount of data (feature value) is used for simple matching; for potential infringement risks (the feature value matching is successful), the in-depth detection layer uses a relatively large amount of data (key data) for in-depth matching. Because obvious non-infringement may be quickly detected by using a small amount of data in the fast detection layer, which is more efficient than in-depth detection; in addition, for non-obvious potential infringement, the in-depth detection layer may perform complex in-depth detection to ensure the accuracy of detection. In this way, the solution provided by the embodiments of the present specification takes into account both efficiency and accuracy.

DETAILED DESCRIPTION

Figure 1:
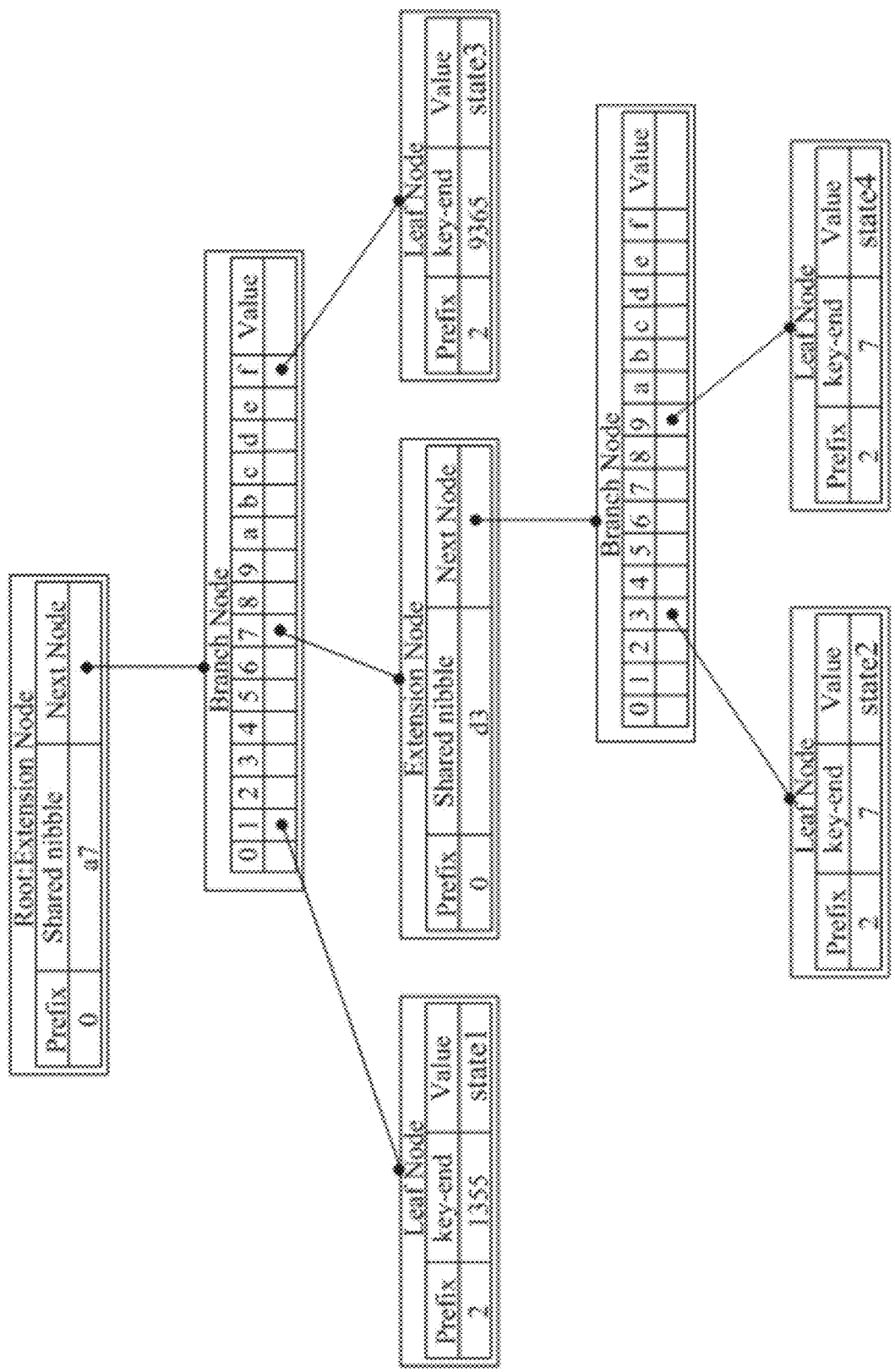
FIG. 1 is a schematic diagram of organizing account state data of a blockchain into an MPT state tree according to an example embodiment.

Example embodiments will be described in detail herein and shown in the drawings. When the following description refers to the accompanying drawings, the same numerals in the different drawings indicate the same or similar elements, unless otherwise indicated. The implementations described below do not represent all implementations consistent with embodiments of the present specification. Instead, they are merely examples of apparatuses and methods consistent with some aspects of the present specification as recited in the appended claims.

It should be noted that in other embodiments, the steps of a corresponding method may not be executed in the order shown and described in the present specification. In some other embodiments, the method may include more or fewer steps than described in the present specification. In addition, a single step described in the present specification may be decomposed into multiple steps for description in other embodiments; and multiple steps described in the present specification may also be combined into a single step in other embodiments for description.

Blockchains are generally classified into three types: a public blockchain, a private blockchain, and a consortium blockchain. In addition, there may also be a combination of the above types, for example, a private blockchain+a consortium blockchain, a consortium blockchain+a public blockchain, and the like.

The public blockchain is most decentralized among the different types. The public blockchain is represented by Bitcoin and Ethereum. Participants who join the public blockchain (also referred to as nodes in the blockchain) can read data records on the blockchain, participate in transactions, compete for bookkeeping rights of new blocks, and so on. Moreover, each node can freely join or exit the network and perform relevant operations.

The private blockchain is opposite. The write permission of the network is controlled by an organization or institution, and the data read permission is regulated by the organization. In brief, a private blockchain may be a weakly centralized system with strict restrictions on nodes and a small number of nodes. This type of blockchain is more suitable for internal use by specific institutions.

The consortium blockchain is a blockchain between the public blockchain and the private blockchain, which may achieve "partial decentralization." Each node in the consortium blockchain may have a corresponding entity or organization; nodes are authorized to join the network and form an interests-related consortium to jointly maintain the operation of the blockchain.

Based on basic characteristics of the blockchain, a blockchain may be composed of blocks. Time stamps corresponding to creation time of the blocks are recorded in these blocks, respectively, and all the blocks follow the time stamps recorded in the blocks to form a time-ordered data chain.

Real data generated in the physical world may be constructed into a standard transaction format supported by the blockchain, and then published to the blockchain, and node devices in the blockchain will perform consensus processing on the received transaction. After reaching a consensus, the node device as the bookkeeping node in the blockchain will package the transaction into a block and carry out persistent deposit in the blockchain.

Consensus algorithms supported in the blockchain may include: a first type of consensus algorithm, that is, a consensus algorithm that node devices need to compete for the bookkeeping right of each round of bookkeeping cycle, for example, Proof of Work (POW), Proof of Stake (POS), Delegated Proof of Stake (DPOS), or other consensus algorithms; and a second type of consensus algorithm, that is, a consensus algorithm that pre-selects a bookkeeping node for each round of bookkeeping cycles (without competing for the bookkeeping right), for example, Practical Byzantine Fault Tolerance (PBFT) or other consensus algorithms.

In the blockchain network using the first type of consensus algorithm, all node devices that compete for a bookkeeping right may execute a transaction after receiving the transaction. One of the node devices competing for the bookkeeping right may win this round and become the bookkeeping node. The bookkeeping node may package the received transaction with other transactions to generate a candidate block, and send the generated candidate block or a block header of the candidate block to other node devices for consensus.

In the blockchain network using the second type of consensus algorithm, the node device with the bookkeeping right has been agreed before this round of bookkeeping. Therefore, after receiving the transaction, if the node device is not the bookkeeping node of this round, it may send the transaction to the bookkeeping node. For the bookkeeping node of this round, the transaction may be executed during or before a process of packaging the transaction together with other transactions to generate a candidate block. After generating the candidate block, the bookkeeping node may send the candidate block or a block header of the candidate block to other node devices for consensus.

Regardless of the consensus algorithm is used by the blockchain, the bookkeeping node of this round may package the received transaction to generate a candidate block, and send the generated candidate block or a block header of the candidate block to other node devices for consensus verification. If other node devices receive the candidate block or the block header of the candidate block, and there is no problem after verification, the candidate block may be appended to the end of the original blockchain as the latest block to complete the blockchain bookkeeping process. In the process of verifying the new block or block header sent by the bookkeeping node, other nodes may also execute the transactions contained in the block.

In the field of blockchains, an important concept is account. Taking Ethereum as an example, Ethereum may classify accounts into external accounts and contract accounts. The external account is an account directly controlled by a user and is also referred to as a user account, while a contract account is an account created by a user by using an external account and contains contract code (that is, a smart contract). For some blockchain models derived from the architecture of Ethereum (such as the Ant blockchain), account types supported by the blockchain may also be further extended, which is not limited in the present specification.

For accounts in the blockchain, a structure may be used to maintain an account state of the account. When a transaction in the block is executed, the state of the account related to the transaction in the blockchain may change.

Taking Ethereum as an example, the structure of an account may include fields such as Balance, Nonce, Code, and Storage.

The Balance field is used to maintain the current account balance of the account.

The Nonce field is used to maintain the number of transactions of the account, e.g., it is a counter used to ensure that each transaction can be processed and can only be processed once, effectively avoiding replay attacks.

The Code field is used to maintain contract code of the account, for example, the Code field may only maintain a hash value of the contract code and therefore, the Code field is may also be referred to as the Codehash field.

The Storage field is used to maintain storage content of the account (the default field value is null); for a contract account, an independent storage space may be allocated to store the storage content of the contract account; and the independent storage space may be called account storage of the contract account. The storage content of the contract account may be constructed as a data structure of a Merkle Patricia Trie (MPT) tree and stored in the above independent storage space, wherein the MPT tree constructed based on the storage content of the contract account may also be referred to as the Storage tree. The Storage field may only maintain a root node of the Storage tree; therefore, the Storage field may also be referred to as the StorageRoot field.

For the external account, the field values of the Code field and the Storage field shown above are all null values.

For most blockchain models, data is stored and maintained by using a Merkle tree or based on the Merkle tree data structure. Taking Ethereum as an example, Ethereum uses the MPT tree (a variant of Merkle tree) as a form of data organization to organize and manage important data such as account states and transaction information.

Ethereum has designed three MPT trees for the data that needs to be stored and maintained in the blockchain, namely an MPT state tree, an MPT transaction tree, and an MPT receipt tree. In addition to the above three MPT trees, there is a Storage tree constructed based on the storage content of the contract account.

The MPT state tree is an MPT tree organized by account state data of all accounts in the blockchain; the MPT transaction tree is an MPT tree organized by transaction data in the blockchain; and the MPT receipt tree is an MPT tree organized by transaction receipts of each transaction generated after the transactions in the block are executed. The hash values of root nodes of the MPT state tree, MPT transaction tree, and MPT receipt tree shown above will eventually be added to the block header of the corresponding block.

The MPT transaction tree and the MPT receipt tree correspond to blocks, that is, each block has its own MPT transaction tree and MPT receipt tree. The MPT state tree is a global MPT tree, which does not correspond to a specific block, but covers the account state data of all accounts in the blockchain.

The organized MPT transaction tree, MPT receipt tree, and MPT state tree will eventually be stored in a Key-Value database (for example, LevelDB) that uses a multi-level data storage structure.

The above database may adopt a multi-level data storage structure, which may be divided into n-level data storage; for example, each level of data storage may be sequentially set to L0, L1, L2, L3 . . . L(n−1). For all levels of data storage in the above database, a smaller level number indicates a high level. For example, L0 stores data of the latest blocks, L1 stores data of the sub-new blocks, and the like.

The read and write performance of storage media corresponding to all levels of data storage may also have performance differences. For example, the read and write performance of storage media corresponding to data storage with a high level (that is, with a small level number) may be higher than that of the storage media corresponding to data storage with a low level. High-level data storage may use storage media with high storage costs and good storage performance, while low-level data storage may use storage media with low unit cost and large capacity.

As the block number of the blockchain increases (also referred to as a block height), the data stored in the database will contain a lot of historical data. Moreover, a block with a smaller block number contains older and less important data. Therefore, in order to reduce the overall storage cost, data of different block heights may be differentiated. For example, data in a block with a small block number may be stored on a storage medium with low cost, and data in a block with a large block number is stored on a storage medium with high cost.

It should be noted that every time the blockchain generates a latest block, after the transaction in the latest block is executed, the account state of the relevant account of the executed transaction in the blockchain (may be an external account or a contract account) may change accordingly.

For example, when a transfer transaction in the block is executed, the balances of the transferor account and transferee account related to the transfer transaction (that is, the field values of the Balance fields of these accounts) may change accordingly.

After the transaction of the node device in the latest block generated by the blockchain is completed, because the account state in the current blockchain has changed, the node device needs to construct an MPT state tree according to the current account state data of all accounts in the blockchain to maintain the latest states of all accounts in the blockchain.

That is, every time a latest block is generated in the blockchain and after the transaction in the latest block is completed, and the account state in the blockchain is thus changed, the node device needs to reconstruct an MPT state tree according to the latest account state data of all accounts in the blockchain. In other words, each block in the blockchain has a corresponding MPT state tree; the MPT state tree maintains the latest account states of all accounts in the blockchain after the transactions in the block are executed.

FIG. 1 is a schematic diagram of organizing account state data of a blockchain into an MPT state tree according to an embodiment.

The MPT tree is a traditional and improved variant of the Merkle tree, which combines advantages of a Merkle tree and a Trie dictionary tree (also known as a prefix tree). There may be three types of data nodes in the MPT tree, namely leaf nodes, extension nodes, and branch nodes.

An extension node is a key-value pair expressed as [key, value], wherein key is a special hexadecimal coded character that represents a shared character prefix of an account address; the shared character prefix refers to a prefix consisting of one or more identical characters of multiple blockchain account addresses; value is the hash value (hash pointer) of another node which means that it may be linked to another node by using the hash pointer. The branch node contains 17 elements. The first 16 elements correspond to the 16 possible hexadecimal characters in the key, and one character corresponds to a nibble (half byte), which respectively represent the shared character prefix of an account address (the length is one character). If there is a [key, value] pair that terminates at this branch node, the branch node may act as a leaf node, and the last element represents the value of the leaf node; conversely, the last element of the branch node may be Null.

The leaf node is a key-value pair expressed as [key, value], wherein key is also a special hexadecimal code character, which represents a character suffix of an account address; the character suffix of the account address and the shared character prefix of the account address together constitute a complete account address; the character suffix refers to a suffix composed by the last one or more characters except the shared character prefix of the account address;

and value is the state data of the account address corresponding to the leaf node (i.e., the structure shown above).

Because on the MPT tree, characters on a search path from a root node to a leaf node constitute a complete account address, for a branch node, it may be either a terminate node of the above search path or an intermediate node of the search path.

Suppose that the account state data that needs to be organized into the MTP state tree is shown in Table 1 below:

TABLE 1

| Account address (Key) | | | | | | | Account Status (Value) |
|---|---|---|---|---|---|---|---|
| a | 7 | 1 | 1 | 3 | 5 | 5 | state1 |
| a | 7 | 7 | d | 3 | 3 | 7 | state2 |
| a | 7 | f | 9 | 3 | 6 | 5 | state3 |
| a | 7 | 7 | d | 3 | 9 | 7 | state4 |

In Table 1, the account address is a character string composed of one or more hexadecimal characters. The account state is a structure composed of the Balance, Nonce, Code, and Storage fields.

Finally, the MPT state tree is organized according to the account state data in Table 1, as shown in FIG. 1. The MPT state tree is composed of four leaf nodes, two branch nodes, and two extension nodes (one of which is the root Node).

In FIG. 1, the prefix field is a prefix field shared by the extension node and the leaf node. Different field values of the prefix field may be used to indicate different node types.

For example, the value of the prefix field is 0, which indicates an extension node that contains an even number of nibbles; as mentioned above, nibble indicates a half byte and consists of 4-bit binary. A nibble may correspond to a character that composes an account address. The value of the prefix field is 1, which indicates an extension node that contains an odd number of nibble(s); the value of the prefix field is 2, which indicates a leaf node that contains an even number of nibbles; the value of the prefix field is 3, which indicates that a leaf node that contains an odd number of nibbles(s).

Since the branch node is a prefix node of a parallel single nibble, the branch node does not have the prefix field mentioned above.

The Shared nibble field in the extension node corresponds to a key value of the key-value pair contained in the extension node, and represents a common character prefix between account addresses; for example, all account addresses in the above table have a common character prefix a7. The Next Node field is filled with a hash value (hash pointer) of the next node.

The 0 to f fields of hexadecimal characters in the branch node correspond to the key value of the key-value pair contained in the branch node. If the branch node is an intermediate node on the search path of the account address on the MPT tree, the Value field of the branch node may be null. The 0 to f fields are filled with the hash value of the next node.

The key-end in the leaf node corresponds to the key value of the key-value pair contained in the leaf node, and represents the last few characters of the account address (character suffix of the account address). The key value of each node on the search path from the root node to the leaf node constitutes a complete account address. The Value field of the leaf node is filled with account status data corresponding to the account address. For example, the structure composed of the aforementioned Balance, Nonce, Code, and storage fields may be encoded and then filled into the Value field of the leaf node.

Further, the node on the MPT state tree shown in FIG. 1 is finally stored in the database in the form of key-value pairs.

When the node on the MPT state tree is stored in the database, the key in the key-value pair of the node on the MPT state tree may be the hash value of the data content contained in the node; and the value in the key-value pair of the node on the MPT state tree is the data content contained in the node.

That is, when storing the node on the MPT state tree to the database, the hash value of the data content contained in the node may be calculated (that is, hash calculation is performed on the entire node), and the calculated hash value is used as the key. The data content contained in the node is used as the value to generate key-value pairs; and then, the generated key-value pairs are stored in the database.

Because the node on the MPT state tree is stored by using the hash value of the data content contained in the node as the key and the data content contained in the node as the value, when it is necessary to query the node on the MPT state tree, content addressing may be performed by e.g., using the hash value of data content contained in the node as the key.

With content addressing, some nodes with repetitive content may be multiplexed to save storage space for data storage.

Figure 2:
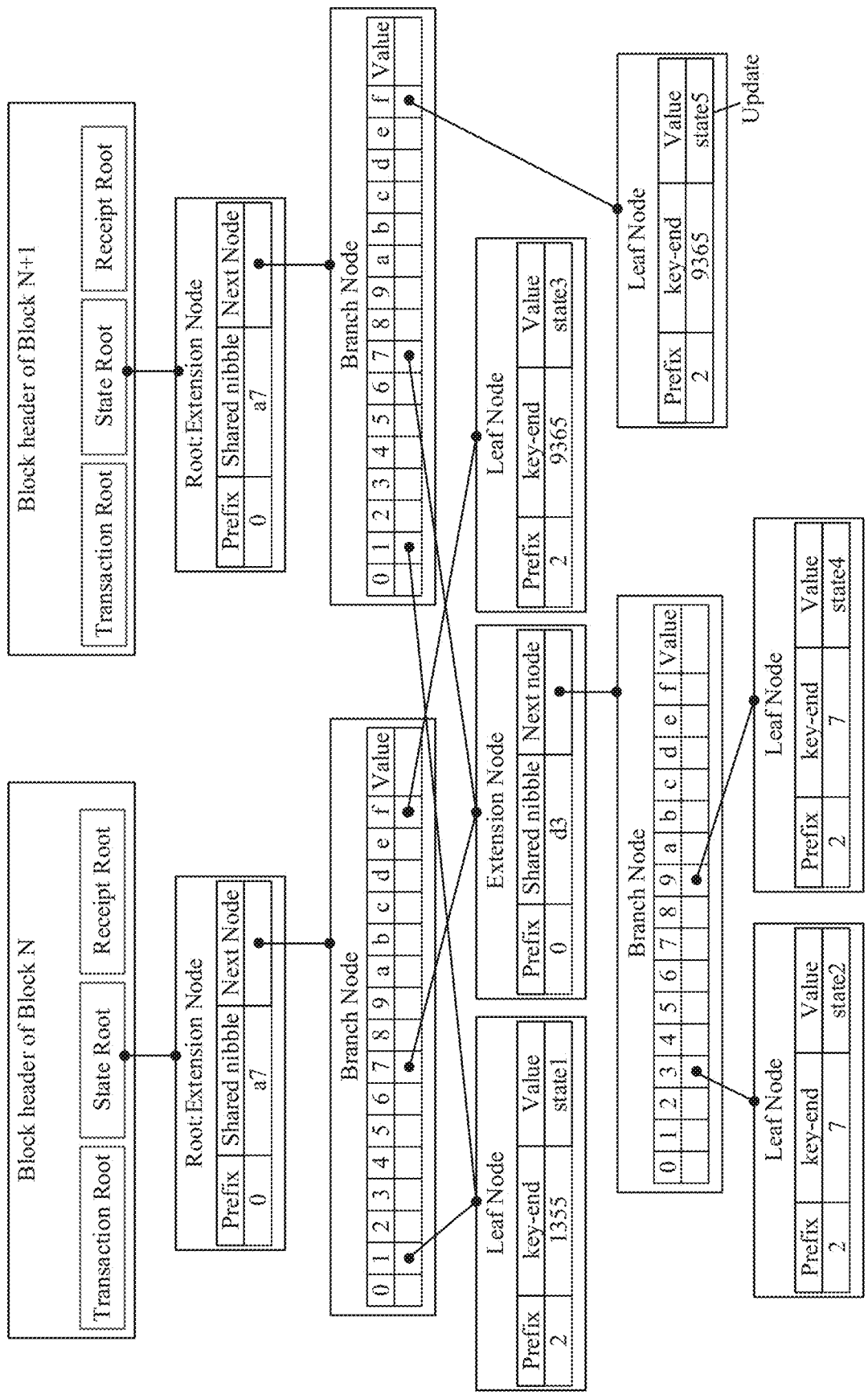
FIG. 2 is a schematic diagram of node multiplexing on an MPT state tree according to an example embodiment.

FIG. 2 is a schematic diagram of node multiplexing on an MPT state tree according to an embodiment. It should be noted that, when the transaction in a latest block generated by the blockchain is executed, it may only cause the account states of some accounts to change; therefore, when constructing the MPT state tree, it may not be necessary to rebuild a complete MPT state tree based on the current state data of all accounts in the blockchain, while it may only be necessary to update nodes corresponding to accounts whose account states change based on the MPT state tree corresponding to the block before the latest block. As for the nodes on the MPT state tree that correspond to the accounts whose account states do not change, since these nodes have not undergone data updates, the corresponding nodes on the MPT state tree corresponding to the block before the latest block may be directly multiplexed.

As shown in FIG. 2, assuming that the account state data in Table 1 is the latest account state of all accounts on the blockchain after the transaction in Block N is executed, the MPT state tree organized based on the account state data in Table 1 is still as shown in FIG. 1.

Suppose that when a transaction in Block N+1 is executed and the account state of an account address "a7f9365" in Table 1 above is updated from "state3" to "state5," at this time when updating the MPT state tree in Block N+1, it is not necessary to reconstruct an MPT state tree based on the current state data of all accounts in the blockchain after the transaction in Block N+1 is executed.

In this case, only the Value in the leaf node whose "key-end" is "9365" on the MPT state tree (that is, the MPT state tree shown in FIG. 1) corresponding to Block N may be updated from "state3" to "state5," and the hash pointers of all nodes on the path from the root node to the leaf node may continue to be updated.

That is, when a leaf node on the MPT state tree is updated, since the overall hash value of the leaf node is updated, the hash pointers of all nodes on the path from the root node to the leaf node will also be updated accordingly.

For example, still referring to FIG. 2, in addition to updating the Value in the leaf node whose "key-end" is "9365," the hash pointer that is filled in the f field of the previous branch node (Branch Node) of the leaf node and that points to the leaf node also needs to be updated. Further, tracing back to the root node, the hash pointer that is filled in the "Next Node" field of the previous root node (Root Extension Node) of the branch node and that points to the branch node may continue to be updated.

Except the nodes that have been updated above, for other nodes that have not been updated, corresponding nodes on the MPT state tree of Block N may be directly multiplexed.

Because the MPT tree corresponding to Block N needs to be retained as historical data eventually, when the MPT state tree is updated in Block N+1, the updated nodes are not directly modified and updated based on the original nodes on the MPT state tree corresponding to Block N, but are recreated on the MPT tree corresponding to Block N+1. That is, on the MPT state tree corresponding to Block N+1, it may only be necessary to reconstruct a small number of updated nodes. For other nodes that have not been updated, corresponding nodes on the MPT state tree corresponding to Block N may be directly multiplexed.

For example, as shown in FIG. 2, for the MPT state tree corresponding to Block N+1, it is only necessary to reconstruct an extension node as the root node, a branch node, and a leaf node; for nodes that have not been updated, the "multiplexing" of the nodes may be completed by adding hash pointers pointing to the corresponding nodes on the MPT state tree corresponding to Block N to these newly constructed nodes on the MPT state tree. Those nodes on the MPT state tree corresponding to Block N before the update will be stored as historical account state data. For example, the leaf node whose "key-end" is "9365" and value is "state3" shown in FIG. 2 will be retained as historical data.

In the above, an example of updating content of a small number of nodes on the MPT state tree of Block N+1 so as to "multiplex" most of the nodes of the previous block Block N is described. In another example, compared with the previous block Block N, the MPT state tree of Block N+1 may also have a new node. In this case, although the newly added node may not be directly "multiplexed" from the MPT tree of the previous block Block N, it may be "multiplexed" from the MPT state tree of an earlier block.

For example, for the new node on the MPT state tree of Block N+1, although it has not appeared on the MPT state tree of Block N, it may appear on the MPT state tree of an earlier block; for example, it appears on the MPT state tree of Block N−1; therefore, the new node on the MPT state tree of Block N+1 may directly multiplex the corresponding node on the MPT state tree of Block N−1.

In embodiments of the present specification, whether it is a public blockchain, a private blockchain, or a consortium blockchain, the function of a smart contract may be provided. A smart contract on the blockchain can be triggered and executed by a transaction on the blockchain. The smart contract may be defined in the form of computer code.

Figure 3:
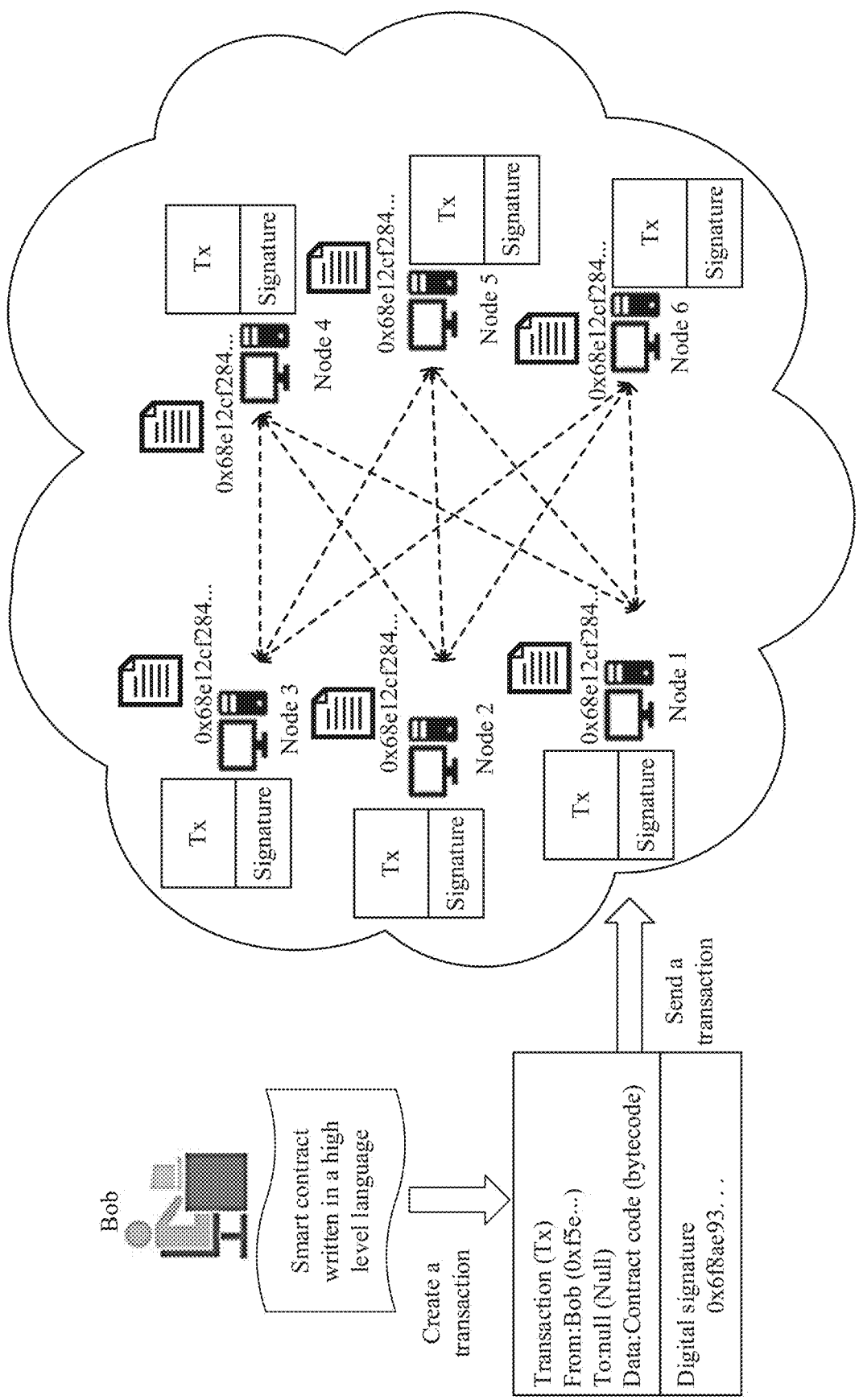
FIG. 3 is a flowchart of creating a smart contract according to an example embodiment.

Taking Ethereum as an example, it supports users to create and invoke some complex logics in the Ethereum network. Ethereum is a programmable blockchain, and its core is the Ethereum Virtual Machine (EVM), and each Ethereum node may run the EVM. The EVM is a Turing-complete virtual machine, through which various complex logics may be realized. Users publish and invoke smart contracts in Ethereum on the EVM. The EVM may directly run virtual machine code (virtual machine bytecode, hereinafter referred to as "bytecode"), so the smart contract deployed on the blockchain may be bytecode. FIG. 3 is a flowchart of creating a smart contract according to an example embodiment. As shown in FIG. 3, after a user Bob sends a transaction containing information of creating a smart contract to the Ethereum network, each node may execute the transaction in the EVM. The From field of the transaction in FIG. 3 is used to record an address of an account that initiated creation of the smart contract, the contract code stored by the field value of the Data field of the transaction may be a bytecode, and the field value of the To field of the transaction is a null account. After the nodes reach an agreement through the consensus mechanism, the smart contract is successfully created, and subsequent users may invoke the smart contract.

After the smart contract is created, a contract account corresponding to the smart contract appears on the blockchain and has a specific address. For example, "0x68e12cf284 . . . " in each node in FIG. 3 represents the address of the created contract account; contract code (Code) and account storage (Storage) will be stored in the account storage of the contract account. The behavior of the smart contract is controlled by the contract code, and the account storage of the smart contract saves the state of the contract. In other words, the smart contract enables a virtual account containing contract code and account storage to be generated on the blockchain.

As mentioned above, the Data field that contains the transaction that creates the smart contract may store the bytecode of the smart contract. The bytecode consists of a series of bytes, and each byte may identify an operation. Based on considerations such as development efficiency and readability, developers may choose a high-level language to write the smart contract code instead of directly writing bytecode. For example, high-level languages such as Solidity, Serpent, and LLL languages may be used. Smart contract code written in a high-level language may be compiled by a compiler to generate bytecode that can be deployed on the blockchain.

Taking the Solidity language as an example, the contract code written with the Solidity language may be similar to the Class in the object-oriented programming language. A variety of members may be declared in a contract, including state variables, functions, function modifiers, and events. The state variable is a value permanently stored in the Storage field of the smart contract, and is used to save the state of the contract.

Figure 4:
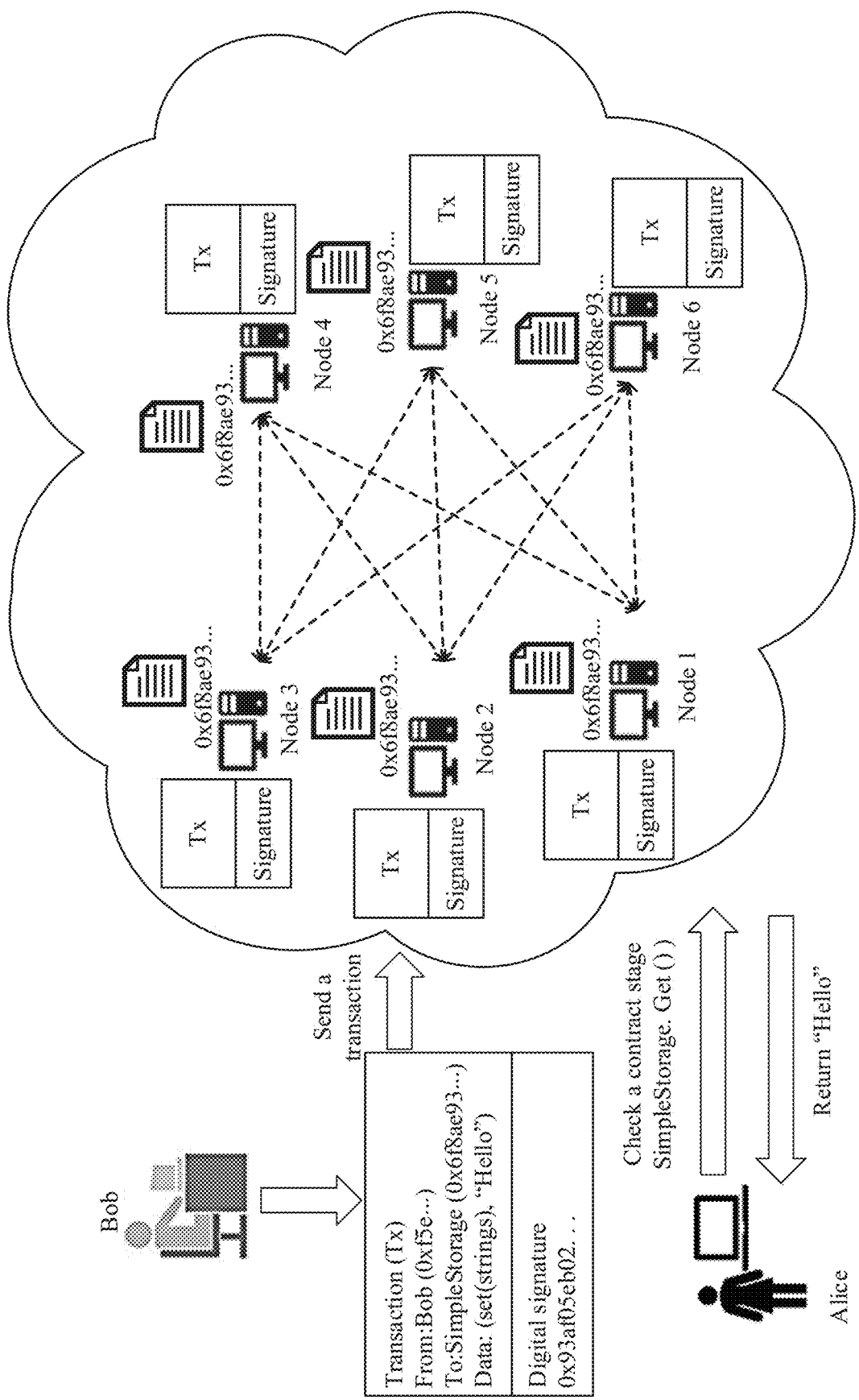
FIG. 4 is a flowchart of invoking a smart contract according to an example embodiment.

FIG. 4 is a flowchart of invoking a smart contract according to an example embodiment. As shown in FIG. 4, still taking Ethereum as an example, after Bob sends a transaction invoking information of a smart contract to the Ethereum network, each node may execute the transaction in the EVM. The From field of the transaction in FIG. 4 is used to record an address of the account that initiated the invoking of the smart contract, the To field is used to record the address of the invoked smart contract, and the Data field of the transaction is used to record the method and parameters of invoking the smart contract. After invoking the smart contract, the account state of the contract account may change. Later, a certain client may view the account state of the contract account by using the connected blockchain node (for example, node 1 in FIG. 4).

Smart contracts may be executed independently on each node in the blockchain network in a prescribed manner. All execution records and data are stored on the blockchain, so when such transactions are executed, a transaction certificate that cannot be tampered with and will not be lost is saved in the blockchain.

Figure 5:
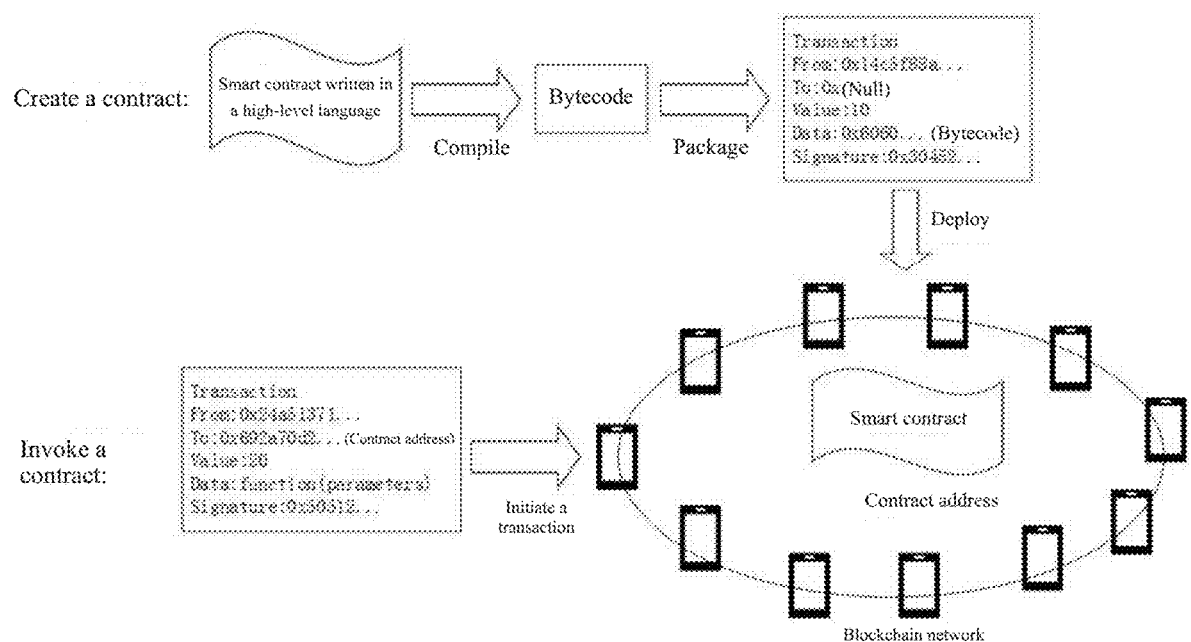
FIG. 5 is a flowchart of creating and invoking a smart contract according to an example embodiment.

FIG. 5 is a flowchart of creating and invoking a smart contract according to an example embodiment. Creating a smart contract in the Ethereum may include the processes of writing a smart contract, turning into bytecode, and deploying to the blockchain. Invoking a smart contract in the Ethereum is to initiate a transaction that points to a smart contract address. The EVM of each node may execute the transaction separately, and the smart contract code may be run in a distributed manner in a virtual machine of each node in the Ethereum network.

In order to achieve "value transfer" on the blockchain, the traditional blockchain model represented by Ethereum may support conversion of real-world currencies into virtual tokens that can be circulated on the blockchain.

In some embodiments of the present specification, blockchain models derived from the Ethereum architecture (such as the Ant blockchain) may not support the conversion of real-world currencies into virtual tokens that can be circulated on the chain. Instead, in these blockchain models, some non-monetary real assets in the real world may be transformed into virtual assets that can be circulated on the blockchain.

The conversion of real assets with non-monetary attributes in the real world into virtual assets on the blockchain may refer to a process of "anchoring" the real assets with virtual assets on the blockchain as the value support of these virtual assets, and then producing value matching with the real assets on the blockchain and circulating between blockchain accounts on the blockchain.

In an embodiment, the account types supported by the blockchain may be extended. On the basis of the account types supported by the blockchain, an asset account (also referred to as an asset object) may be extended. For example, an asset account is extended on the basis of external accounts and contract accounts supported by Ethereum. The extended asset account is the virtual asset that can use real-world non-monetary real assets as value support and may circulate between accounts in the blockchain.

For users who access this type of blockchain, in addition to completing the creation of user accounts and smart contracts on the blockchain, virtual assets whose value matching the real-world non-monetary real assets and circulating on the blockchain may be created on the blockchain.

For example, users may convert non-monetary real assets such as real estate, stocks, loan contracts, bills, and accounts receivable into virtual assets with matching value to circulate on the blockchain.

For the above asset accounts, a structure may be used to maintain an account state of the account. The content contained in the structure of the asset account may be the same as that of Ethereum, and may also be designed based on actual needs.

In an embodiment, taking the content contained in the structure of the asset account being the same as that of Ethereum as an example, the structure of the asset account may also include the fields such as Balance, Nonce, Code, and Storage described above.

It should be noted that in Ethereum, the Balance field is usually used to maintain the current account balance of the account; and for the blockchain model derived from the Ethereum architecture, it may not support conversion of the real-world currency into virtual tokens that can be circulated on the chain. Therefore, in this type of blockchain, the meaning of the Balance field may be extended. It no longer represents the "balance" of the account, but is used to maintain the address information of the asset account corresponding to the "virtual asset" owned by the account. In an embodiment, the Balance field may maintain address information of asset accounts corresponding to multiple "virtual assets."

In this case, the external accounts, contract accounts, and asset accounts shown above may hold the virtual asset by adding address information of the asset account corresponding to the "virtual asset" that needs to be held in the Balance field. That is, in addition to external accounts and contract accounts, the asset account itself may also hold virtual assets.

For asset accounts, the field values of the Nonce and Code fields may or may not be null; the field value of the Storage field may not be null; and the Storage field may be used to maintain the asset state of the "virtual asset" corresponding to the asset account. The specific method of maintaining the asset state of the "virtual asset" corresponding to the asset account in the Storage field may be flexibly designed based on requirements.

In the blockchain model derived from the architecture of Ethereum, users may create virtual assets on the blockchain that match the values of real-world non-monetary real assets through the following implementations.

In an embodiment, the transaction types supported by the blockchain may be extended to create a transaction for creating virtual assets. For example, the transaction types supported by Ethereum may include ordinary transfer transactions, smart contract creation transactions, and smart contract invoking transactions. On the basis of the above three types of transactions, transactions for creating virtual assets may be extended.

For example, a user may publish a transaction for creating a virtual asset to the blockchain network by using a client, and a node device in the blockchain executes the transaction in the local EVM to create virtual assets for the user. After all node devices reach an agreement through the consensus mechanism, the virtual asset is successfully created, and an asset account corresponding to the virtual asset appears on the blockchain and has a specific address.

In an embodiment, a smart contract for creating a virtual asset may also be deployed on the blockchain.

For example, a user may publish a transaction for invoking the smart contract to the blockchain network through the client, and the node device in the blockchain executes the transaction in the local EVM and runs contract code related to the smart contract in the EVM to create a virtual asset for the user. After all node devices reach an agreement through the consensus mechanism, the virtual asset is successfully created, and an asset account corresponding to the virtual asset appears on the blockchain and has a specific address.

For some blockchain models derived from the Ethereum architecture, if they support the function of converting real-world currencies into virtual tokens that can be circulated on the blockchain, some non-monetary real assets in the real world may still be transformed into virtual tokens that can be circulated on the blockchain to circulate on the blockchain.

In a cross-chain scenario, multiple blockchains may achieve cross-chain connection through cross-chain relays.

The cross-chain relays may be respectively connected to multiple blockchains through bridge interfaces, and implement cross-chain data synchronization between the multiple blockchains based on an implemented data transport logic.

The cross-chain technology used in the implementation of the above cross-chain relay is not particularly limited in the present specification. For example, multiple blockchains may be connected through cross-chain mechanisms such as a side-chain technology and a notary technology.

After multiple blockchains are connected through cross-chain relays, the blockchains may read and authenticate data on other blockchains, and smart contracts deployed on other blockchains may be invoked by using cross-chain relays.

It should be noted that cross-chain relay is used to transport data between multiple blockchains, and does not require persistent storage of the transported data, nor does it need to maintain the data state of the transported data. Cross-chain relays may be configured on devices, nodes, or platforms other than the multiple blockchains they are connected to, or may be configured on the node devices of multiple blockchains that they are connected to, which is not limited in the present specification.

In some embodiments, smart contracts deployed on the blockchain may only refer to the data content stored on the blockchain. In some embodiments, for some complex business scenarios implemented based on the smart contract technology, smart contracts may also refer to external data on off-chain data entities.

For example, the smart contract deployed on the blockchain may use an oracle to refer to the data on the off-chain data entities so as to implement data interaction between the smart contract and the real-world data entity. The off-chain data entities may include centralized servers or data centers deployed outside the chain, and so on.

It should be noted that the cross-chain relay is used to connect two blockchains, and the oracle is used to connect the blockchains to off-chain data entities to implement data interaction between the blockchains and the real world.

In an embodiment, when deploying an oracle for a smart contract on the blockchain, an oracle smart contract corresponding to the oracle may be firstly deployed on the blockchain, wherein the oracle smart contract is used to maintain external data sent by the oracle to the smart contract on the blockchain. For example, the external data sent by the oracle to the smart contract on the blockchain may be stored in an account storage space of the oracle smart contract.

When a target smart contract on the blockchain is invoked, external data required by the target smart contract may be read from the account storage space of the oracle smart contract to complete an invoking process of the smart contract.

It should be noted that when the oracle sends external data to the smart contract on the blockchain, it may adopt a method of active sending or a method of passive sending.

In an embodiment, the off-chain data entity may use a private key of the oracle to sign the external data that needs to be provided to a target smart contract, and then send it to the oracle smart contract. For example, in time, it may send the signed external data to the oracle smart contract periodically.

The above oracle smart contract may maintain a CA (certification authority) certificate of the oracle. After receiving the external data sent by the off-chain data entity, a public key of the oracle maintained in the CA certificate may be used to verify a signature of the external data. After the verification is passed, the external data sent by the off-chain data entity is stored in the account storage space of the oracle smart contract.

In another embodiment, when the target smart contract on the blockchain is invoked, if the external data required by the target smart contract is not read from the account storage space of the oracle smart contract, at this time, the oracle smart contract may use an event mechanism of the smart contract to interact with the oracle, and the oracle sends the external data required by the target smart contract to the account storage space of the oracle smart contract.

For example, when the target smart contract on the blockchain is invoked, if the external data required by the target smart contract is not read from the account storage space of the oracle smart contract, the oracle smart contract may generate an external data acquisition event, record the external data acquisition event in a transaction log of the transaction invoking the smart contract, and store the transaction log into the storage space of the node device. The above oracle may monitor the transaction log generated by the oracle smart contract stored in the storage space of the node device, and in response to the monitored external data acquisition event after monitoring the external data acquisition event in the transaction log, send the external data required by the target smart contract to the aforementioned oracle smart contract.

The event mechanism of smart contracts is a way for smart contracts to interact with off-chain entities. For a smart contract deployed on the blockchain, it may not directly interact with an off-chain entity. For example, after the smart contract is invoked, it may not send an invoking result of the smart contract to an invoking initiator of the smart contract in a point-to-point manner.

The invoking results (including an intermediate result and a final invoking result) generated by the smart contract during the invoking may be recorded in the form of Events in the transaction logs of the transaction that invoked the smart contract, and are stored in the storage space of the node device. The off-chain entity that needs to interact with the smart contract may acquire the invoking results of the smart contract by monitoring the above transaction logs stored in the storage space of the node device.

For example, taking Ethernet as an example, the transaction logs will be eventually stored in the above described MPT receipt tree as a portion of content of the receipt of the transaction that invoked the smart contract. The off-chain entity interacting with the smart contract may monitor the transaction receipt on the MPT receipt tree stored in the storage space of the node device and acquire an event generated by the smart contract from the monitored transaction receipt.

Based on the above embodiments for implementing blockchain, embodiments of the present specification further provide methods and devices for blockchain-based infringement detection.

Figure 6:
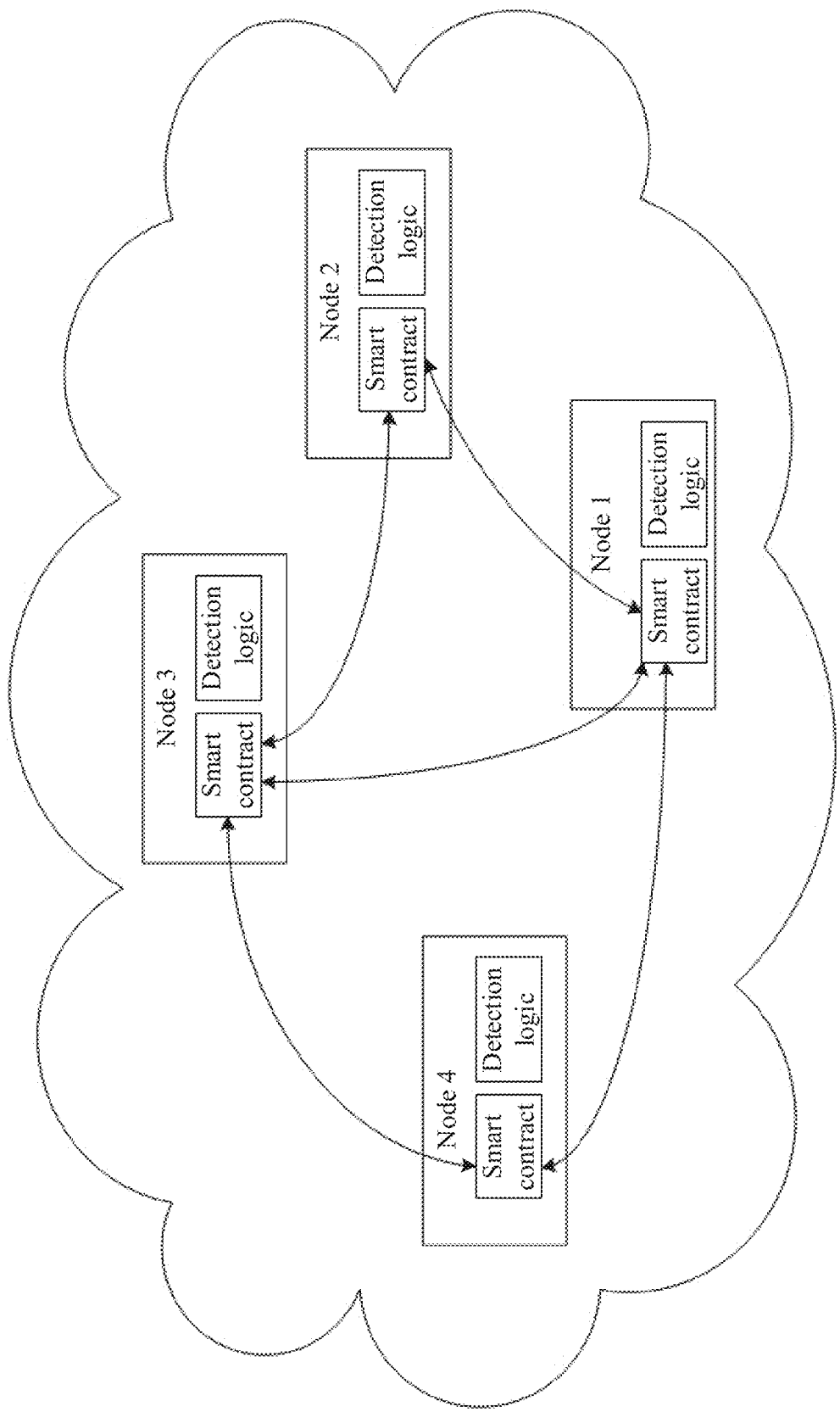
FIG. 6 is a schematic diagram of a blockchain network for infringement detection according to an example embodiment.

FIG. 6 is a schematic diagram of a blockchain network for infringement detection according to an example embodiment. The blockchain is jointly formed by a number of node devices (only node 1 to node 4 are exemplarily shown in FIG. 6). The blockchain network records key data of a deposited work stored in a blockchain and a feature value extracted from work content of the deposited work. The key data includes data used to prove that the work is an original work, for example, original design drafts of photographic works, the drafts in the design process, etc.

As shown in FIG. 6, a smart contract for infringement detection on a work to be deposited is deployed in the blockchain. The blockchain may allocate a corresponding contract account to the smart contract and have a specific contract address. The user may invoke a smart contract corresponding to the contract address by accessing a corresponding blockchain node based on a client held, for executing the relevant business logic. For example, a code logic corresponding to contract code in the smart contract includes a first detection logic and a second detection logic, the first detection logic is configured to quickly detect the feature value of the work content, and the second detection logic is configured for in-depth detection of the key data itself.

Figure 7:
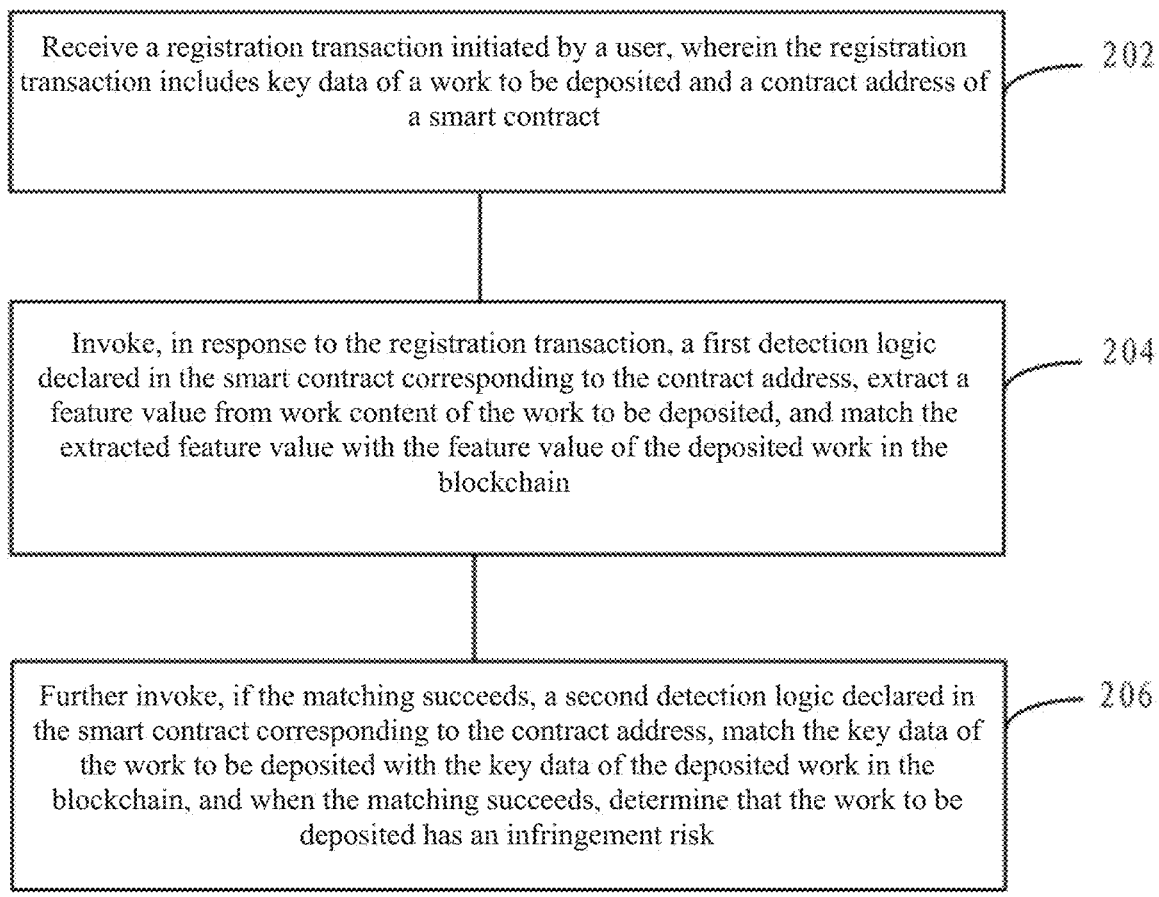
FIG. 7 is a flow chart of a blockchain-based infringement detection method according to an example embodiment.

Illustration is further made in the following with reference to a flow chart of a blockchain-based infringement detection method shown in FIG. 7. As described above, the blockchain stores key data of a deposited work and a feature value extracted from work content of the deposited work, and the key data includes data proving that the work is an original work; the blockchain is deployed with a smart contract for infringement detection of a work to be deposited, and a code logic corresponding to contract code in the smart contract includes a first detection logic and a second detection logic. The method includes the following steps.

In step 202, a registration transaction initiated by a user is received, wherein the registration transaction includes key data of the work to be deposited and a contract address of a smart contract.

In step 204, in response to the registration transaction, a first detection logic declared in the smart contract corresponding to the contract address is invoked, a feature value is extracted from work content of the work to be deposited, and the extracted feature value is matched with a feature value of a deposited work in the blockchain.

In step 206, if the matching succeeds, a second detection logic declared in the smart contract corresponding to the contract address is further invoked, the key data of the work to be deposited is matched with the key data of the deposited work in the blockchain, and when the matching succeeds, it is determined that the work to be deposited has an infringement risk.

The blockchain-based infringement method realizes data evidence fixing of a work by using blockchain technology, and detects whether an infringement exists in the work during the process of evidence fixing. The data evidence fixing or evidence fixing refers to depositing key data submitted by a user.

The blockchain used in the method may include any type of blockchain networks that each user who joins the blockchain accesses as a member. For example, the blockchain is a consortium blockchain, and each user may join the blockchain as a member device.

The steps 202 to 206 are described in detail below.

In step 202, a registration transaction initiated by a user is received.

For example, after an author completes creation of an original work, the original work may need to be registered to protect own rights and interests. The user may use installed client software corresponding with a blockchain system to access a blockchain, and upload work content and key data of a work to be deposited. The client software may be installed on a node device in the blockchain network. The key data, of the work to be deposited, uploaded by the user may be uploaded to the blockchain for deposit in the form of a registration transaction. In other words, the registration transaction initiated by the user includes the work content and key data of the work to be deposited and a contract address of a smart contract to be invoked in response to the registration transaction.

In the example, the original work is regarded as the work to be deposited, a registration transaction is initiated to the blockchain system for the work to be deposited, and the registration transaction includes the key data of the work to be deposited and the contract address of the smart contract. Storing the key data proving that the work to be deposited is an original work into the blockchain may play a role in fixing original evidence. In this way, in the event of subsequent infringement of the work, the deposited key data may be used as an original evidence to facilitate efficient handling of infringement disputes. The key data includes, but is not limited to, work content attributes of the original work, original design drafts, drafts during a design process, and so on.

In step 204, in response to the registration transaction, a first detection logic declared in the smart contract corresponding to the contract address is invoked, a feature value is extracted from work content of the work to be deposited, and the extracted feature value is matched with the feature value of the deposited work in the blockchain.

For example, in response to the registration transaction, the node device invokes the first detection logic declared in the smart contract corresponding to the contract address.

The first detection logic is configured to quickly detect the feature value of the work content. For example, the feature value is first extracted from the work content of the work to be deposited, and the extracted feature value is then matched with the feature value of the deposited work in the blockchain.

The feature value extracted from the work content may include unique information representing the work content. The feature value may be extracted from the work content of the work to be deposited, and a feature value extraction algorithm used may be an algorithm commonly used in a target industry.

Because different algorithms are applicable to different file types, an algorithm to be used here may be determined according to a file type of the work to be deposited. For example, for a work to be deposited of a text type, a text recognition algorithm such as a Term Frequency-Inverse Document Frequency (TF-IDF) algorithm may be used to extract a feature value from the work content of the work to be deposited. For a work to be deposited of a picture type, an image recognition algorithm such as Scale-invariant feature transform (SIFT) and Speeded Up Robust Features (SURF) may be used to extract a feature value from the work content of the work to be deposited.

In an embodiment, the feature value may refer to information that can quickly reflect the work content, for example, a central idea of an article, focal content of an image, and the like. Generally, the amount of data of a feature value is small, and while the amount of data is small, it is equivalent to condensing the work content. Usually, the feature value can still quickly reflect the most important information that the work wants to express or display.

The feature value may be used for similarity matching. By calculating the similarity between the feature values of two works, it may be determined whether the two works have similar work content. If they are similar, it indicates that the latter work is suspected of infringing the previous one.

In an embodiment, the matching the extracted feature value of the work to be deposited with the feature value of the deposited work in the blockchain may include: calculating a first similarity between the extracted feature value of the work to be deposited and the feature value of the deposited work in the blockchain, wherein the similarity calculation may use the Eucledian Distance algorithm, the Manhattan Distance algorithm, the Minkowski distance algorithm, the Cosine Similarity algorithm, and other algorithms used for calculating similarity.

If the first similarity exceeds a first threshold, it indicates that the matching succeeds. At this time, it indicates that the work to be deposited has an infringement possibility, but it may not be accurately determined whether the infringement is true. Therefore, step 206 is further performed to accurately determine the infringement by in-depth detection.

In step 206, if the matching succeeds, a second detection logic declared in the smart contract corresponding to the contract address is further invoked, the key data of the work to be deposited is matched with the key data of the deposited work in the blockchain, and when the matching succeeds, it is determined that the work to be deposited has an infringement risk.

The second detection logic is configured for in-depth detection of key data. For example, the key data of the work to be deposited is matched with the key data of the deposited work in the blockchain.

Similar to feature value matching, the key data herein may also be used for similarity matching. By calculating the similarity between the key data of two works, it may be determined whether the two works are similar. If they are similar, it indicates that the work to be deposited infringes the deposited work.

In an embodiment, the matching the key data of the work to be deposited with key data of the deposited work in the blockchain, and when the matching succeeds, determining that the work to be deposited has an infringement risk includes: calculating a second similarity between the key data of the work to be deposited with the key data of the deposited work in the blockchain, and when the second similarity exceeds a second threshold, determining that the work to be deposited has an infringement risk.

In addition, because different algorithms are applicable to different file types, a similarity algorithm to be used for calculation may be determined according to a file type of the work to be deposited.

For example, for the work to be deposited being of a text type, a second similarity between the key data of the work to be deposited and the key data of the deposited work in the blockchain is calculated by using a text similarity algorithm.

Also for example, As the work to be deposited being of a picture type, the key data of the work to be deposited is calculated by using a picture similarity algorithm. As for the work to be deposited of a text type, a second similarity between the key data of the work to be deposited and the key data of the deposited work in the blockchain is calculated by using a text similarity algorithm.

As another example, for the work to be deposited being of a video type, a second similarity between the key data of the work to be deposited and the key data of the deposited work in the blockchain is calculated by using a video similarity algorithm.

In an embodiment, the registration transaction further includes a file type of the work to be deposited, and the second detection logic includes second detection logics corresponding to different file types.

In step 206, the further invoking the second detection logic declared in the smart contract corresponding to the contract address includes: further invoking the second detection logic corresponding to the file type of the work to be deposited in the smart contract corresponding to the contract address.

In an embodiment, when it is determined that the work to be deposited has an infringement risk, an infringement processing logic declared in the smart contract corresponding to the contract address is further invoked, and a prompt of submitting new key data is sent to the user so that the user submits new key data to prove a difference between the work to be deposited and the deposited work.

In the embodiment, the contract code of the smart contract may also include an infringement processing logic. The infringement processing logic is configured to send an infringement detection result to a user who submits the work to be deposited to remind the user of submitting more detailed and sufficient key data, and highlight differences between the deposited work that is similar to the work to be deposited, thereby proving the originality of the work to be deposited.

This processing may improve the originality of users by adding more key data, and may reduce the risk of infringing the deposited work. In addition, works of users may be protected earlier and more comprehensively, and these deposited key data may be used as evidence when the works are infringed by other works, so as to fully protect the rights and interests of the users.

In an embodiment, when it is determined that the work to be deposited has an infringement risk, an infringement processing logic declared in the smart contract corresponding to the contract address is further invoked, and a prompt message is sent to a target user corresponding to the deposited work that succeeds in matching; key data of both parties is shared when the target user provides original authorization.

In the embodiment, the infringement processing logic may also be used to solicit the authorization of the infringed target user for negotiation between the target user and the user of the work to be deposited. When the original authorization provided by the target user is received, key data of both parties may be shared.

In some embodiments, there may be recreations that users recreate on the basis of published works. Although this type of creation includes own creative content of a user, it uses the originality of a published work after all. Therefore, the recreated work itself has the risk of infringement. In this case, if authorized by the target user of the published work, the recreated work may be deposited.

In an embodiment, when it is determined that a work to be deposited has an infringement risk, an infringement processing logic declared in a smart contract corresponding to the contract address is further invoked to simultaneously push relevant information (work content, key data, and the like) of the work to be deposited and the existing work to both parties (a user of the work to be deposited and a target user of the deposited work). When either party requests manual review, it will be manually reviewed for infringement; and when there is an infringement, it is automatically submitted to an arbitration institution (such as a court) for ruling.

In an embodiment, when it is determined that the work to be deposited does not infringe any deposited work, a deposit logic declared in the smart contract corresponding to the contract address is further invoked to store key data of the work to be deposited and the extracted feature value in the blockchain.

It may be determined from the following two results that the work to be deposited does not infringe any deposited work.

The first result is that the extracted feature value fails in matching with the feature value of the deposited work in the blockchain, which is obtained by quick matching using the first detection logic.

The second result is that the key data of the work to be deposited fails in matching with the key data of the deposited work in the blockchain, which is obtained by in-depth matching using the second detection logic.

In an embodiment, work content of a work to be deposited, a feature value extracted from the work content, and key data may be stored in a blockchain, and the key data may be used as original evidence of data to be recorded.

Embodiments of the present specification provide a blockchain-based infringement detection method, which may quickly perform infringement determination on the work to be deposited by using a double-layer detection mechanism of rapid detection and in-depth detection. In the fast detection layer, a relatively small amount of data (feature value) is used for simple matching; for potential infringement risks (the feature value matching is successful), the in-depth detection layer uses a relatively large amount of data (key data) for in-depth matching. Because obvious non-infringement may be quickly detected by using a relatively small amount of data in the fast detection layer, which is more efficient than in-depth detection; in addition, for non-obvious potential infringement, the in-depth detection layer may perform complex in-depth detection to ensure the accuracy of detection. In this way, the method provided by the embodiments of the present specification takes into account both efficiency and accuracy.

In some embodiments, the second detection logic and the first detection logic may be located in the same smart contract, which may not be conducive to the maintenance and management of the logic code, particularly when different second detection logics need to be used for the works to be deposited of different file types for in-depth detection.

In some embodiments, to facilitate the maintenance and management of the logic code, the second detection logic may exist as a separate smart contract. For example, the second detection logic may exist as an independent smart contract. In order to distinguish a smart contract of the first detection logic, the smart contract where the first detection logic is located is called a first smart contract, and a contract address thereof is called a first contract address; the smart contract where the second detection logic is located is called a second smart contract, and a contract address thereof is called a second contract address. In order to enable the first smart contract to invoke the second detection logic declared in the second smart contract, the second contract address may be written into the first smart contract.

In some embodiments, second smart contracts may be separately created for different file types, for example, each file type corresponds to a second smart contract applicable to the respective file type.

Figure 8:
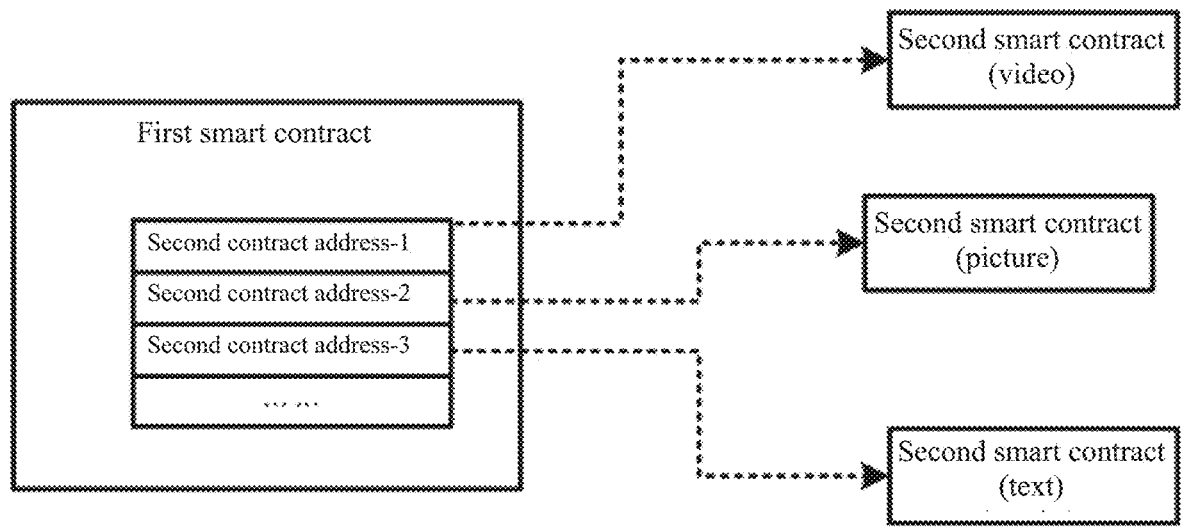
FIG. 8 is a schematic diagram of a first smart contract and a second smart contract according to an example embodiment.

FIG. 8 is a schematic diagram of a first smart contract and a second smart contract according to an example embodiment. As shown in FIG. 8, a blockchain is deployed with a first smart contract and multiple second smart contracts. Different second contract addresses are written in the first smart contract. Each of the second contract addresses correspond to a different second smart contract.

For example, a second smart contract for a video type corresponding to second contract address-1 is configured to detect a work of a video type and calculate a similarity of key data of video.

Also for example, a second smart contract for a picture type corresponding to second contract address-2 is configured to detect a work of a picture type and calculate a similarity of key data of image.

As another example, a second smart contract for a text type corresponding to second contract address-3 is configured to detect a work of a text type and calculate a similarity of key data of text.

In an embodiment, the smart contract deployed in the blockchain for infringement detection of the work to be deposited includes a first smart contract and a second smart contract, a code logic corresponding to contract code in the first smart contract includes a first detection logic, and a code logic corresponding to contract code in the second smart contract includes a second detection logic, wherein a second contract address of the second smart contract is recorded in the first smart contract, and a contract address included in the registration transaction is a first contract address of the first smart contract.

In an embodiment, the contract address included in the registration transaction in step 202 (FIG. 7) is a first contract address of the first smart contract; the invoking the first detection logic declared in the smart contract corresponding to the contract address in step 204 (FIG. 7) includes: invoking the first detection logic declared in the first smart contract corresponding to the first contract address; and the further invoking, if the matching succeeds, a second detection logic declared in the smart contract corresponding to the contract address in step 206 (FIG. 7) includes: further invoking, if the matching succeeds, the second detection logic declared in the second smart contract corresponding to the second contract address according to the second contract address recorded in the first smart contract.

In an embodiment, the registration transaction further includes a file type of the work to be deposited, and the second contract address recorded in the first smart contract includes second contract addresses corresponding to different file types. The further invoking the second detection logic declared in the second smart contract corresponding to the second contract address according to the second contract address recorded in the first smart contract includes: further invoking the second detection logic declared in the second smart contract corresponding to the second contract address that corresponds to the file type of the work to be deposited according to the second contract addresses corresponding to different file types recorded in the first smart contract.

By separately deploying the second detection logic as a second smart contract, detection logics may be individually configured for different file types. It is conducive to maintenance and invoking of the second detection logic. On the one hand, consistency of the second detection logics between different nodes may be ensured; on the other hand, when the second detection logic needs to be modified, it will not affect the first smart contract where the first detection logic is located.

Corresponding to the above method embodiments, embodiments of the present specification further provide a blockchain-based infringement detection apparatus. The apparatus may be applied to an electronic device, each module in the apparatus may be implemented by software, or hardware, or a combination of hardware and software.

Figure 9:
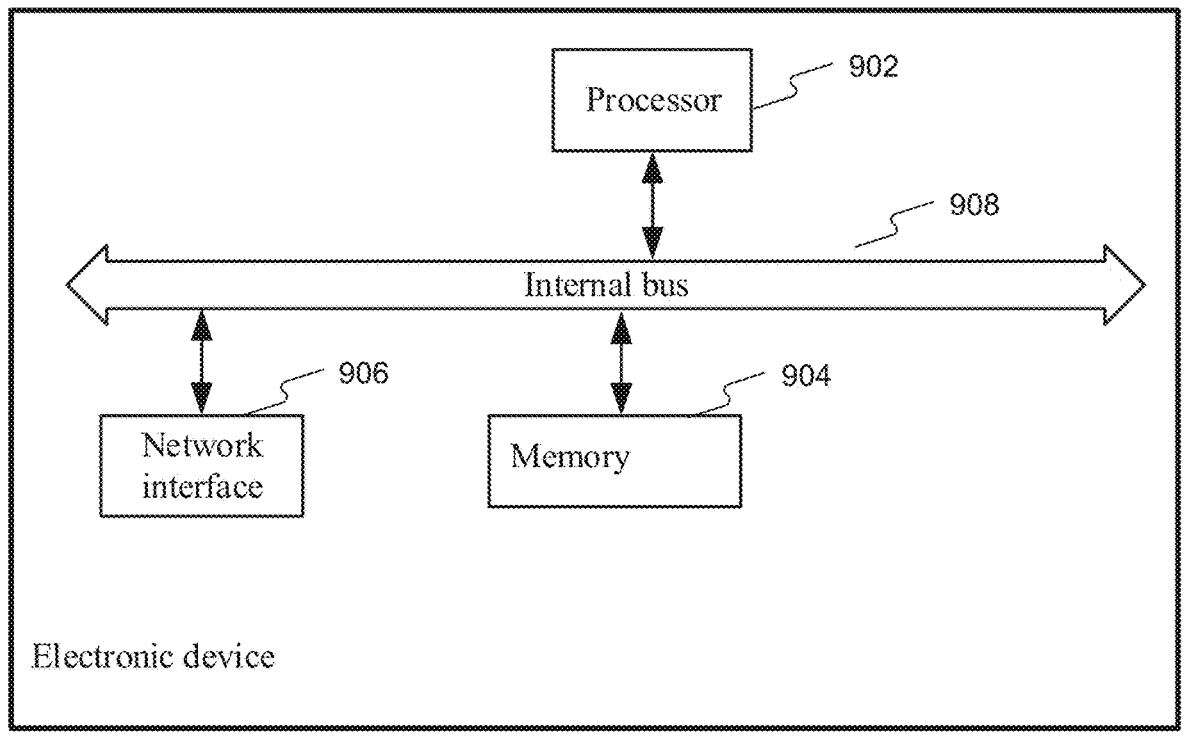
FIG. 9 is a schematic diagram of an electronic device according to an example embodiment.

FIG. 9 is a schematic diagram of an electronic device according to an example embodiment. The electronic device may include a processor 902, a memory 904 storing instructions executable by the processor 902, a network interface 906, and an internal bus 908. The processor 902 is configured to perform the above blockchain-based infringement detection methods.

Figure 10:
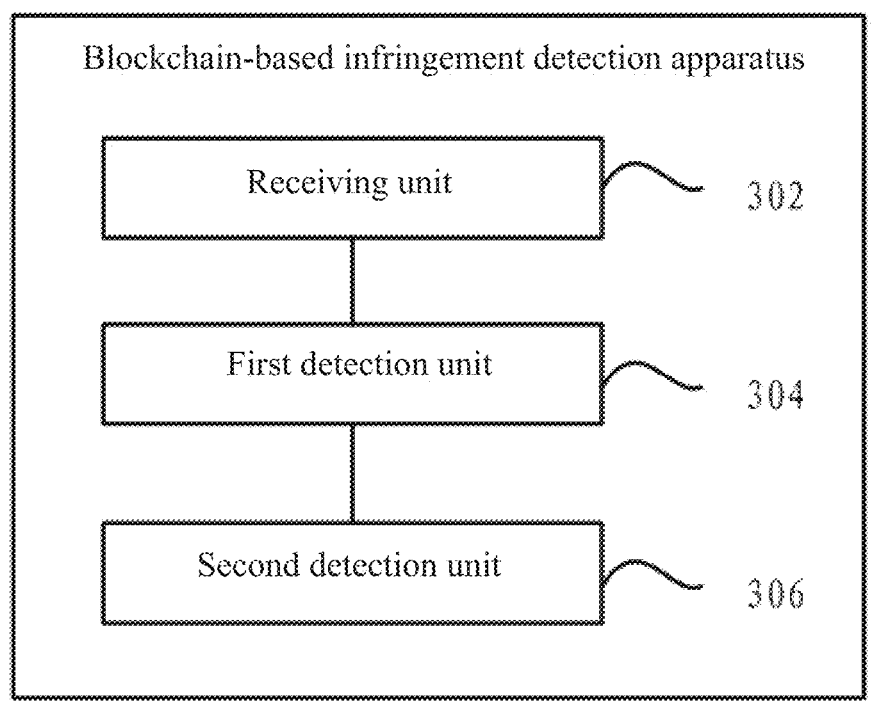
FIG. 10 is a block diagram of a blockchain-based infringement detection apparatus according to an example embodiment.

FIG. 10 is a block diagram of a blockchain-based infringement detection apparatus according to an example embodiment. The blockchain-based infringement detection apparatus may be applied to the electronic device in FIG. 9. The blockchain stores key data of a deposited work and a feature value extracted from work content of the deposited work, and the key data includes data proving that the work is an original work. The blockchain is deployed with a smart contract for infringement detection of a work to be deposited, and a code logic corresponding to contract code in the smart contract includes a first detection logic and a second detection logic. The apparatus includes: a receiving unit 302, a first detection unit 304, and a second detection unit 306.

The receiving unit 302 is configured to receive a registration transaction initiated by a user, wherein the registration transaction includes key data of the work to be deposited and a contract address of the smart contract.

The first detection unit 304 is configured to invoke, in response to the registration transaction, a first detection logic declared in the smart contract corresponding to the contract address, extract a feature value from work content of the work to be deposited, and match the extracted feature value with the feature value of the deposited work in the blockchain.

The second detection unit 306 is configured to further invoke, if the matching succeeds, a second detection logic declared in the smart contract corresponding to the contract address, match the key data of the work to be deposited with the key data of the deposited work in the blockchain, and when the matching succeeds, determine that the work to be deposited has an infringement risk.

In an embodiment, the matching, by first detection unit 304, the extracted feature value with the feature value of the deposited work in the blockchain includes: calculating a first similarity between the extracted feature value and the feature value of the deposited work in the blockchain; and further invoking by second detection unit 306, if the matching succeeds, a second detection logic declared in the smart contract corresponding to the contract address includes: further invoking, if the first similarity exceeds a first threshold, the second detection logic declared in the smart contract corresponding to the contract address.

In an embodiment, the matching, by second detection unit 306, the key data of the work to be deposited with the key data of the deposited work in the blockchain, and when the matching succeeds, determining that the work to be deposited has an infringement risk includes: calculating a second similarity between the key data of the work to be deposited and the key data of the deposited work in the blockchain, and when the second similarity exceeds a second threshold, determining that the work to be deposited has an infringement risk.

In an embodiment, the apparatus further includes: a first processing unit configured to further invoke, when it is determined that the work to be deposited has an infringement risk, an infringement processing logic declared in the smart contract corresponding to the contract address, send a prompt of submitting new key data to the user so that the user submits new key data to prove a difference between the work to be deposited and the deposited work.

In an embodiment, the apparatus further includes: a second processing unit configured to further invoke, when it is determined that the work to be deposited has an infringement risk, an infringement processing logic declared in the smart contract corresponding to the contract address, and send a prompt message to a target user corresponding to the deposited work that succeeds in matching; and share key data of both parties when the target user provides original authorization.

In an embodiment, the apparatus further includes: a deposit unit configured to further invoke, when the matching between the extracted feature value and the feature value of the deposited work in the blockchain fails, or the matching between the key data of the work to be deposited and the key data of the deposited work in the blockchain fails, a deposit logic declared in the smart contract corresponding to the contract address and store the key data of the work to be deposited and the extracted feature value in the blockchain.

In an embodiment, the smart contract deployed in the blockchain for infringement detection of the work to be deposited includes a first smart contract and a second smart contract, the code logic corresponding to the contract code in the first smart contract includes a first detection logic, and a code logic corresponding to contract code in the second smart contract includes a second detection logic, wherein the second contract address of the second smart contract is recorded in the first smart contract, and the contract address included in the registration transaction is a first contract address of the first smart contract; the invoking, by first detection unit 304, the first detection logic declared in the smart contract corresponding to the contract address includes: invoking the first detection logic declared in the first smart contract corresponding to the first contract address; the further invoking, by second detection unit 306, if the matching succeeds, a second detection logic declared in the smart contract corresponding to the contract address includes: further invoking, if the matching succeeds, the second detection logic declared in the second smart contract corresponding to the second contract address according to the second contract address recorded in the first smart contract.

In an embodiment, the registration transaction further includes a file type of the work to be deposited, and the second contract address recorded in the first smart contract includes second contract addresses corresponding to different file types; the further invoking, by second detection unit 306, the second detection logic declared in the second smart contract corresponding to the second contract address according to the second contract address recorded in the first smart contract includes: further invoking the second detection logic declared in the second smart contract corresponding to the second contract address that corresponds to the file type of the work to be deposited according to second contract addresses corresponding to different file types recorded in the first smart contract.

In an embodiment, the registration transaction further includes a file type of the work to be deposited, and the second detection logic includes second detection logics corresponding to different file types; the further invoking, by second detection unit 306, the second detection logic declared in the second smart contract corresponding to the second contract address includes: further invoking the second detection logic corresponding to the file type of the work to be deposited in the smart contract corresponding to the contract address.

In an embodiment, the blockchain includes a consortium blockchain.

The apparatuses, devices, or units in the above embodiments may be implemented by a computer chip or entity, or by a product with a certain function. An example implementation device is a computer, such as a personal computer, a laptop computer, a cellular phone, a camera phone, a smart phone, a personal digital assistant, a media player, a navigation device, an email sending and receiving device, a game console, a tablet computer, a wearable device, or a combination of any of these devices.

Embodiments of the present specification also provide a non-transitory computer-readable storage medium having stored therein instructions that, when executed by a processor of a device, cause the device to perform the above blockchain-based infringement detection methods. An example of the computer-readable medium is a memory. The memory may include a volatile memory, a Random Access Memory (RAM), and/or non-volatile memory in computer-readable media, e.g., a Read-Only Memory (ROM) or a flash RAM.

The computer-readable medium includes permanent and non-permanent, removable and non-removable media, and may store information by any method or technology. The information may be computer-readable instructions, data structures, program modules, or other data. Examples of a storage medium of a computer include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only compact disc read-only memory (CD-ROM), digital versatile disc (DVD) or other optical storage, magnetic tape cassettes, magnetic disk storage, quantum memory, graphene storage, or other magnetic storage devices, or any other non-transmission medium, and may be used to store information that may be accessed by computing devices. As defined herein, the computer-readable medium does not include temporary computer-readable media (transitory media), such as a modulated data signal and a carrier.

The foregoing describes example embodiments of this specification. Other embodiments may be within the scope of the appended claims. In some cases, the actions or steps described above may be performed in a different order and may still achieve desired results. In addition, the processes depicted in the drawings do not necessarily require the particular order shown or a sequential order to achieve the desired results. In some embodiments, multitasking and parallel processing may also be feasible or may be advantageous.

The terminology used in the present specification is for the purpose of describing example embodiments only, and is not intended to limit the present specification. For example, although the terms "first" and "second" may be used to describe various information in the present specification, the information should not be limited to these terms. These terms are only used to distinguish the same type of information from each other. For example, without departing from the scope of the present specification, first information may also be referred to as second information, and similarly, second information may also be referred to as first information. Depending on the context, the word "if" as used herein may be interpreted as "when" or "in response to determination."

The foregoing descriptions are merely example embodiments of the present specification and are not intended to limit the present specification. For those skilled in the art, the present specification may have various alterations and changes. Any modification, equivalent replacement, improvement, and the like made within the spirit and principle of the present specification shall be included in the scope of the claims.

The invention claimed is:

1. A blockchain-based infringement detection method, wherein a blockchain stores first key data of a deposited work and a first feature value extracted from first work content of the deposited work, and the first key data comprises data proving that the deposited work is an original work; the blockchain is deployed with a smart contract for infringement detection of a work to be deposited, the method comprising:

receiving a registration transaction initiated by a user, wherein the registration transaction comprises second key data of the work to be deposited and a contract address of the smart contract;

invoking, in response to the registration transaction, a first detection logic declared in the smart contract corresponding to the contract address, extracting a second feature value from second work content of the work to be deposited, and matching the extracted second feature value with the first feature value of the deposited work in the blockchain; and further invoking, when the matching succeeds, a second detection logic declared in the smart contract corresponding to the contract address, matching the second key data of the work to be deposited with the first key data of the deposited work in the blockchain that comprises the data proving that the deposited work is the original work, and when the matching succeeds, determining that the work to be deposited has an infringement risk.

2. The blockchain-based infringement detection method according to claim 1, wherein the matching the extracted second feature value with the first feature value of the deposited work in the blockchain comprises:

calculating a first similarity between the extracted second feature value and the first feature value of the deposited work in the blockchain;

the further invoking, when the matching succeeds, the second detection logic declared in the smart contract corresponding to the contract address, matching the second key data of the work to be deposited with the first key data of the deposited work in the blockchain, and when the matching succeeds, determining that the work to be deposited has an infringement risk comprises:

further invoking, when the first similarity exceeds a first threshold, the second detection logic declared in the smart contract corresponding to the contract address.

3. The blockchain-based infringement detection method according to claim 1, wherein the matching the second key data of the work to be deposited with the first key data of the deposited work in the blockchain, and when the matching succeeds, determining that the work to be deposited has an infringement risk comprises:

calculating a second similarity between the second key data of the work to be deposited and the first key data of the deposited work in the blockchain, and when the second similarity exceeds a second threshold, determining that the work to be deposited has an infringement risk.

4. The blockchain-based infringement detection method according to claim 1, further comprising:

further invoking, when it is determined that the work to be deposited has an infringement risk, an infringement processing logic declared in the smart contract corresponding to the contract address, sending the user a prompt of submitting new key data to prove a difference between the work to be deposited and the deposited work.

5. The blockchain-based infringement detection method according to claim 1, further comprising:

further invoking, when it is determined that the work to be deposited has an infringement risk, an infringement processing logic declared in the smart contract corresponding to the contract address, and sending a prompt message to a target user corresponding to the deposited work; and sharing the second key data of the work to be deposited and the first key data of the deposited work between both users when the target user provides original authorization.

6. The blockchain-based infringement detection method according to claim 1, further comprising:
further invoking, when the matching between the extracted second feature value and the first feature value of the deposited work in the blockchain fails, or the matching between the second key data of the work to be deposited and the first key data of the deposited work in the blockchain fails, a deposit logic declared in the smart contract corresponding to the contract address and storing the second key data of the work to be deposited and the extracted second feature value in the blockchain.

7. The blockchain-based infringement detection method according to claim 1, wherein the smart contract deployed in the blockchain for infringement detection of the work to be deposited comprises a first smart contract and a second smart contract, the first smart contract comprises the first detection logic, the second smart contract comprises the second detection logic, a second contract address of the second smart contract is recorded in the first smart contract, and the contract address in the registration transaction is a first contract address of the first smart contract;
the invoking the first detection logic declared in the smart contract corresponding to the contract address comprises: invoking the first detection logic declared in the first smart contract corresponding to the first contract address; and
the further invoking, when the matching succeeds, the second detection logic declared in the smart contract corresponding to the contract address comprises: further invoking, when the matching succeeds, the second detection logic declared in the second smart contract corresponding to the second contract address according to the second contract address recorded in the first smart contract.

8. The blockchain-based infringement detection method according to claim 7, wherein the registration transaction further comprises a file type of the work to be deposited, and the second contract address recorded in the first smart contract comprises second contract addresses corresponding to different file types; and
the further invoking the second detection logic declared in the second smart contract corresponding to the second contract address according to the second contract address recorded in the first smart contract comprises:
further invoking the second detection logic declared in the second smart contract corresponding to the second contract address that corresponds to the file type of the work to be deposited according to the second contract addresses corresponding to different file types recorded in the first smart contract.

9. The blockchain-based infringement detection method according to claim 1, wherein the registration transaction further comprises a file type of the work to be deposited, and the second detection logic comprises second detection logics corresponding to different file types; and
the further invoking the second detection logic declared in the smart contract corresponding to the contract address comprises:
further invoking the second detection logic corresponding to the file type of the work to be deposited in the smart contract corresponding to the contract address.

10. The blockchain-based infringement detection method according to claim 1, wherein the blockchain comprises a consortium blockchain.

11. A blockchain-based infringement detection device, wherein a blockchain stores first key data of a deposited work and a first feature value extracted from first work content of the deposited work, and the first key data comprises data proving that the deposited work is an original work; the blockchain is deployed with a smart contract for infringement detection of a work to be deposited, the device comprising:
a processor; and
a memory storing instructions executable by the processor,
wherein the processor is configured to:
receive a registration transaction initiated by a user, wherein the registration transaction comprises second key data of the work to be deposited and a contract address of the smart contract;
invoke, in response to the registration transaction, a first detection logic declared in the smart contract corresponding to the contract address, extract a second feature value from second work content of the work to be deposited, and match the extracted second feature value with the first feature value of the deposited work in the blockchain; and
further invoke, when the matching succeeds, a second detection logic declared in the smart contract corresponding to the contract address, match the second key data of the work to be deposited with the first key data of the deposited work in the blockchain that comprises the data proving that the deposited work is the original work, and when the matching succeeds, determine that the work to be deposited has an infringement risk.

12. The blockchain-based infringement detection device according to claim 11, wherein the processor is further configured to:
calculate a first similarity between the extracted second feature value and the first feature value of the deposited work in the blockchain; and
further invoke, when the first similarity exceeds a first threshold, the second detection logic declared in the smart contract corresponding to the contract address.

13. The blockchain-based infringement detection device according to claim 11, wherein the processor is further configured to:
calculate a second similarity between the second key data of the work to be deposited and the first key data of the deposited work in the blockchain, and when the second similarity exceeds a second threshold, determine that the work to be deposited has an infringement risk.

14. The blockchain-based infringement detection device according to claim 11, wherein the processor is further configured to:
further invoke, when it is determined that the work to be deposited has an infringement risk, an infringement processing logic declared in the smart contract corresponding to the contract address, send the user a prompt of submitting new key data to prove a difference between the work to be deposited and the deposited work.

15. The blockchain-based infringement detection device according to claim 11, wherein the processor is further configured to:
further invoke, when it is determined that the work to be deposited has an infringement risk, an infringement processing logic declared in the smart contract corresponding to the contract address, and send a prompt message to a target user corresponding to the deposited work; and share the second key data of the work to be deposited and the first key data of the deposited work between both users when the target user provides original authorization.

16. The device blockchain-based infringement detection according to claim 11, wherein the processor is further configured to:
further invoke, when the matching between the extracted second feature value and the first feature value of the deposited work in the blockchain fails, or the matching between the second key data of the work to be deposited and the first key data of the deposited work in the blockchain fails, a deposit logic declared in the smart contract corresponding to the contract address and store the second key data of the work to be deposited and the extracted second feature value in the blockchain.

17. The blockchain-based infringement detection device according to claim 11, wherein the smart contract deployed in the blockchain for infringement detection of the work to be deposited comprises a first smart contract and a second smart contract, the first smart contract comprises the first detection logic, the second smart contract comprises the second detection logic, and a second contract address of the second smart contract is recorded in the first smart contract, and the contract address in the registration transaction is a first contract address of the first smart contract; and
the processor is further configured to:
invoke the first detection logic declared in the first smart contract corresponding to the first contract address; and
further invoke, when the matching succeeds, the second detection logic declared in the second smart contract corresponding to the second contract address according to the second contract address recorded in the first smart contract.

18. The blockchain-based infringement detection device according to claim 17, wherein the registration transaction further comprises a file type of the work to be deposited, and the second contract address recorded in the first smart contract comprises second contract addresses corresponding to different file types; and
the processor is further configured to:
further invoke the second detection logic declared in the second smart contract corresponding to the second contract address that corresponds to the file type of the work to be deposited according to second contract addresses corresponding to different file types recorded in the first smart contract.

19. The blockchain-based infringement detection device according to claim 11, wherein the registration transaction further comprises a file type of the work to be deposited, and the second detection logic comprises second detection logics corresponding to different file types; and
the processor is further configured to:
further invoke the second detection logic corresponding to the file type of the work to be deposited in the smart contract corresponding to the contract address.

20. The blockchain-based infringement detection device according to claim 11, wherein the blockchain comprises a consortium blockchain.

* * * * *